United States Patent
McLelland et al.

(10) Patent No.: US 10,508,048 B2
(45) Date of Patent: Dec. 17, 2019

(54) REMOVAL OF OIL RECOVERY CHEMICALS FROM PRODUCTION FLUIDS

(71) Applicants: William G. McLelland, Bartlesville, OK (US); Sally Ann Thomas, Bartlesville, OK (US)

(72) Inventors: William G. McLelland, Bartlesville, OK (US); Sally Ann Thomas, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 258 days.

(21) Appl. No.: 15/093,324

(22) Filed: Apr. 7, 2016

(65) Prior Publication Data

US 2016/0297690 A1 Oct. 13, 2016

Related U.S. Application Data

(60) Provisional application No. 62/143,958, filed on Apr. 7, 2015.

(51) Int. Cl.
| | |
|---|---|
| *E21B 43/34* | (2006.01) |
| *C02F 1/40* | (2006.01) |
| *B01D 17/02* | (2006.01) |
| *C02F 1/52* | (2006.01) |
| *C02F 101/30* | (2006.01) |

(Continued)

(52) U.S. Cl.
CPC ............... *C02F 1/40* (2013.01); *B01D 17/02* (2013.01); *B01D 17/0202* (2013.01);
(Continued)

(58) Field of Classification Search
None
See application file for complete search history.

(56) References Cited

U.S. PATENT DOCUMENTS

| | | | | |
|---|---|---|---|---|
| 3,102,100 A | * | 8/1963 | Greenwald | .......... B01D 17/047 507/246 |
| 4,014,801 A | * | 3/1977 | Fullinwider | ......... B01D 17/047 166/305.1 |

(Continued)

FOREIGN PATENT DOCUMENTS

| | | |
|---|---|---|
| WO | 2013/189842 A1 | 12/2013 |
| WO | 2014/042809 A1 | 3/2014 |
| WO | 2014127227 | 8/2014 |

OTHER PUBLICATIONS

Dictionary.com, water softener, retrieved Jun. 3, 2019 from https://www.dictionary.com/browse/water-softener (Year: 2019).*

(Continued)

*Primary Examiner* — Angela M DiTrani Leff
(74) *Attorney, Agent, or Firm* — Boulware & Valoir

(57) ABSTRACT

Methods and systems for processing production fluid include embodiments for removal of injected chemicals from the production fluid. An embodiment of a method includes receiving production fluid from a borehole in an earth formation, the production fluid including surfactants injected into the earth formation to stimulate production of hydrocarbons therefrom. The method also includes processing the production fluid to separate the production fluid into at least an oil phase and produced water, introducing a treatment fluid from a treatment fluid source into at least one of the production fluid and the produced water, and removing the surfactants from at least the produced water. The treatment fluid includes a concentration of multivalent cations, the multivalent cations configured to reduce water solubility of the surfactants.

12 Claims, 3 Drawing Sheets

(51) Int. Cl.
  *C02F 101/32* (2006.01)
  *C02F 103/10* (2006.01)
  *C02F 1/20* (2006.01)
  *C02F 1/42* (2006.01)
  *C02F 1/44* (2006.01)
  *C02F 1/469* (2006.01)
  *C02F 101/10* (2006.01)
  *C02F 103/36* (2006.01)

(52) U.S. Cl.
  CPC ........ B01D 17/0208 (2013.01); C02F 1/5236 (2013.01); E21B 43/34 (2013.01); *C02F 1/20* (2013.01); *C02F 1/42* (2013.01); *C02F 1/441* (2013.01); *C02F 1/444* (2013.01); *C02F 1/447* (2013.01); *C02F 1/4691* (2013.01); *C02F 2001/425* (2013.01); *C02F 2101/103* (2013.01); *C02F 2101/301* (2013.01); *C02F 2101/32* (2013.01); *C02F 2103/10* (2013.01); *C02F 2103/365* (2013.01); *C02F 2201/001* (2013.01); *C02F 2301/046* (2013.01)

(56) References Cited

U.S. PATENT DOCUMENTS

| | | | | |
|---|---|---|---|---|
| 4,029,570 A | * | 6/1977 | Coffman | C10G 33/04 166/267 |
| 4,182,689 A | | 1/1980 | Presley et al. | |
| 4,216,079 A | * | 8/1980 | Newcombe | B01D 17/047 208/188 |
| 4,277,352 A | * | 7/1981 | Allison | B01D 17/047 166/266 |
| 4,743,385 A | * | 5/1988 | Angstadt | C09K 8/584 166/270.1 |
| 4,765,910 A | * | 8/1988 | Wolf | B01D 12/00 166/267 |
| 7,033,504 B1 | * | 4/2006 | Blytas | B01D 17/047 166/267 |
| 2003/0175081 A1 | * | 9/2003 | Shiau | B09C 1/002 405/128.7 |
| 2006/0096920 A1 | | 5/2006 | Ayala | |
| 2009/0314702 A1 | | 12/2009 | Mazzei | |
| 2010/0155337 A1 | * | 6/2010 | Gao | C02F 9/00 210/724 |
| 2011/0108270 A1 | | 5/2011 | Crews et al. | |
| 2014/0008271 A1 | | 1/2014 | Moene | |
| 2014/0128296 A1 | | 5/2014 | Soane et al. | |
| 2015/0166363 A1 | * | 6/2015 | Eyal | B01D 11/0403 210/652 |

OTHER PUBLICATIONS

International Search Report for parent case, App. No. PCT/US2016/026476, dated Jul. 11, 2016.

* cited by examiner

REMOVAL OF OIL RECOVERY CHEMICALS FROM PRODUCTION FLUIDS

CROSS-REFERENCE TO RELATED APPLICATIONS

This application is a non-provisional application which claims benefit under 35 USC § 119(e) to U.S. Provisional Application Ser. No. 62/143,958 filed Apr. 7, 2015, entitled "REMOVAL OF OIL RECOVERY CHEMICALS FROM PRODUCTION FLUIDS," which is incorporated herein in its entirety.

STATEMENT REGARDING FEDERALLY SPONSORED RESEARCH

None.

FIELD OF THE INVENTION

This invention relates to systems and processes for hydrocarbon production and recovery. In another aspect, the invention concerns processes for enhanced oil recovery and removal of chemicals used in oil recovery from produced fluids.

BACKGROUND OF THE INVENTION

Enhanced oil recovery (EOR) has been the subject of renewed interest in the hydrocarbon exploration and production industry. EOR encompasses a variety of techniques for enhancing production from oil and gas fields, such as gas injection, water injection and chemical injection. Chemical EOR (CEOR) typically involves pumping an injection fluid including polymers and/or surfactants into a formation to increase the amount of oil recovered. Some CEOR chemicals are returned to the surface with production fluid, and may need to be removed in order to permit disposal or reuse of produced water. This is a particular concern in offshore production, as disposal options are limited.

SUMMARY OF THE INVENTION

One embodiment includes a method of processing production fluid. The method includes receiving production fluid from a borehole in an earth formation, the production fluid including surfactants injected into the earth formation to stimulate production of hydrocarbons therefrom. The method also includes processing the production fluid to separate the production fluid into at least an oil phase and produced water, introducing a treatment fluid from a treatment fluid source into at least one of the production fluid and the produced water, and removing the surfactants from at least the produced water. The treatment fluid includes a concentration of multivalent cations, the multivalent cations configured to reduce water solubility of the surfactants.

Another embodiment includes a system for processing production fluid. The system includes a production line coupled to a borehole in an earth formation, and a processing facility configured to receive production fluid from the production line, the production fluid including surfactants injected into the earth formation to stimulate production of hydrocarbons therefrom, the processing facility including a separator configured to separate the production fluid into at least an oil phase and produced water. The system also includes a surfactant removal facility configured to introduce a treatment fluid from a treatment fluid source into at least one of the production fluid and the produced water, the treatment fluid including a concentration of multivalent cations, the multivalent cations configured to reduce water solubility of the surfactants.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

Embodiments described herein include systems, devices and methods for production of hydrocarbons and processing of production fluid. "Production fluid" refers to a liquid and/or gaseous stream removed from an earth formation, which may include hydrocarbon fluids (e.g., oil and natural gas) and non-hydrocarbon fluids (e.g., water and stimulation fluids). An embodiment of a production and/or processing system includes processing equipment configured to separate production fluid into oil, gas and water phases, and configured to treat production fluid and produced water to remove contaminates. The production and/or processing system also includes devices or components configured to facilitate removal of surfactant chemicals from the production fluid by introducing or injecting a treatment fluid that includes multivalent cations. The multivalent cations act to reduce the water solubility of surfactants in the production fluid, which allows for effective removal of such surfactants from the production fluid at selected stages of processing. For example, the treatment fluid may be injected into production fluid prior to separation from bottom of the wellbore to production separator, and/or the treatment fluid may be injected into produced water.

Figure 1:
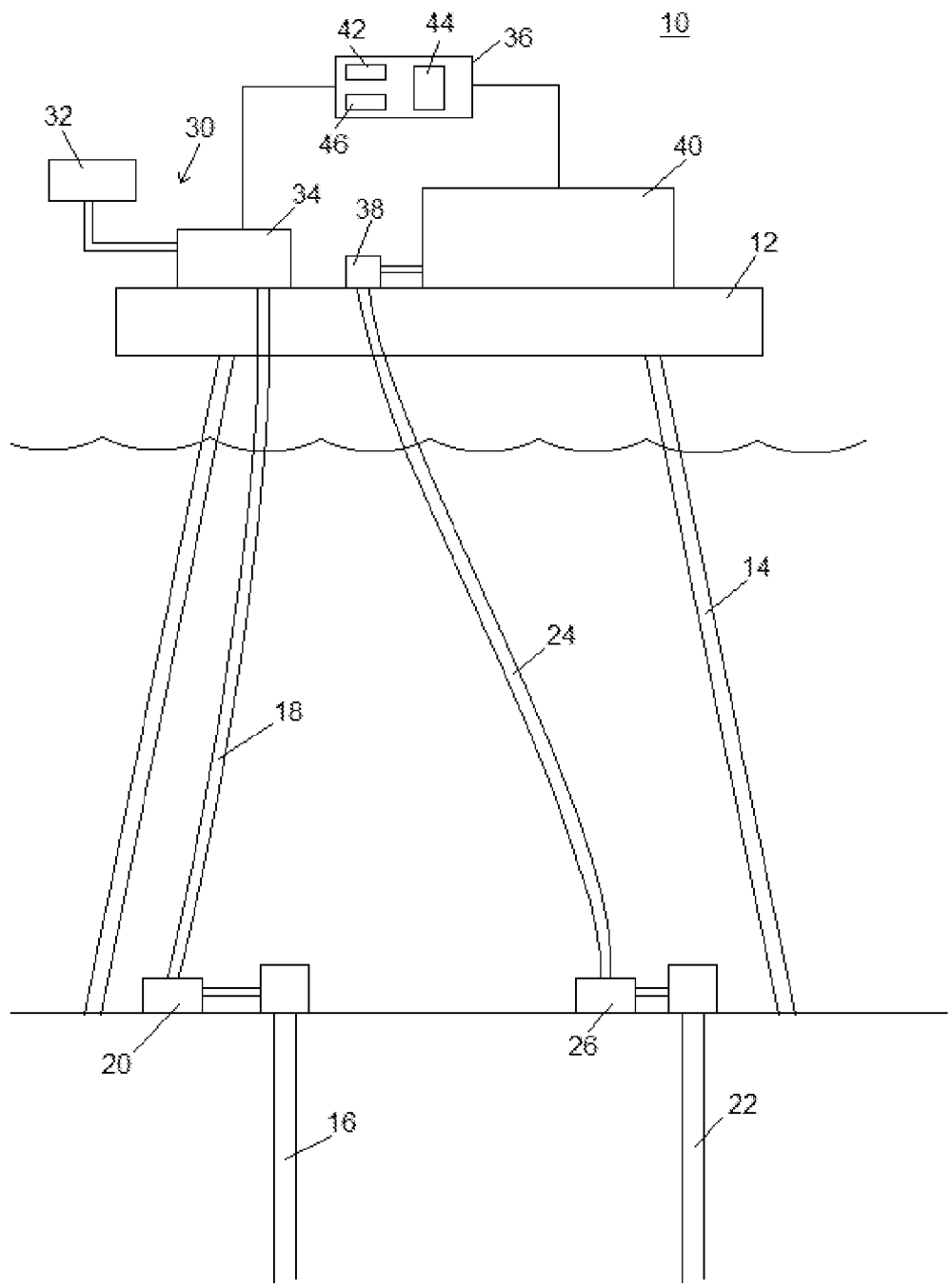
FIG. 1 depicts an embodiment of an offshore hydrocarbon production and processing system.

FIG. 1 illustrates an embodiment of a hydrocarbon production and/or processing system 10. The system 10 includes an offshore platform 12, such as a wellhead and/or processing platform, secured to a seabed via support legs 14 or other support structures. The platform 12 is connected to at least one injection borehole 16 by an injection riser or flowline 18 and a seabed unit 20, and is connected to at least one production borehole 22 by a production riser or flowline 24 and a seabed unit 26. The platform 12 may be connected to any number of boreholes, and each seabed unit and/or riser may be connected to a single borehole or multiple branched boreholes. In addition, injection may be performed via a different structure, such as a floating vessel or another platform.

The platform shown in FIG. 1 is exemplary and not intended to be limiting. Various other types of offshore structures may be used, e.g., floating vessels (e.g., Floating Production, Storage, and Offloading Vessels (FPSO)), compliant tower platforms, tension leg platforms, spar platforms and others. The production and processing facilities in the system 10 may be located on a single platform or multiple connected platforms. Embodiments herein may also be applied to onshore drilling, production and/or processing.

The platform 12 includes or is connected to various production and processing facilities. For example, an injection facility 30 includes components to facilitate injection of fluid material into the injection borehole 16, such as an injection fluid source 32 and a pumping unit 34 coupled to the injection flowline 18. The source 32 and/or the pumping unit 34 are connected to a processing unit 36. Although injection is shown in this embodiment as being performed at the platform 12, injection may be performed by other systems or components, such as the seabed unit 20.

Production fluid in this embodiment is brought to the platform 12 via the production flowline 24 to a manifold 38 a through a production fluid line to a processing facility 40 configured to receive the production fluid and perform functions including separation of the production fluid into oil, gas and/or water phases. Other functions performed by the processing facility include treatment of produced water, disposal of treated water (e.g., discharge into the ocean), and/or provision of treated produced water for use by the injection facility 40.

The processing unit 36 is connected in operable communication with the injection facility 30 and/or the processing facility 40. The processing unit 36 may be located, for example, at a location on the platform 12, a subsea location and/or a remote location (e.g., at another platform or an onshore location). The processing unit 36 may be configured to perform functions such as controlling the injection facility 30 and/or the processing facility 40, transmitting and receiving data, monitoring and analysis of measurement data. The processing unit 36, in one embodiment, includes a processor 42, a data storage device (or a computer-readable medium) 44 for storing data and computer programs or software 46.

In one embodiment, the system 10 is configured to implement one or more of various techniques for increasing production capacity of the formation. Such techniques include enhanced oil recovery (EOR) techniques. Exemplary EOR techniques include gas injection, water injection and chemical injection. Chemical EOR (CEOR) involves the injection of various chemicals into the formation.

Hydrocarbon production processes can typically (but not exclusively) be categorized into three or more stages, including primary, secondary and tertiary stages. During the primary production stage, hydrocarbons are produced due to the natural energy of a hydrocarbon reservoir. During the secondary production stage, additional production is stimulated through the use of water injection to maintain reservoir pressure. EOR and CEOR techniques are typically considered to be part of the tertiary stage of hydrocarbon production.

In some instances, at least a portion of the chemicals used in CEOR are produced back to the surface with production fluid. At least some of these chemicals should be removed before discharging produced water back into the ocean or re-using the produced water.

CEOR techniques include, but are not limited to, injection of fluids into the formation that include surfactants and/or polymers. Polymers may be included to increase the viscosity of the injection fluid, which can increase the amount of oil produced. Surfactants are compounds that are partly soluble in both water and oil, and tend to concentrate at the oil/water interface, where they form interfacial films. This generally leads to a lowering of the interfacial tension (IFT), which enhances removal of oil from the formation. Exemplary CEOR techniques include surfactant polymer floods, alkali surfactant polymer floods, surfactant assisted water floods and foam floods.

Surfactants and other CEOR chemicals present in production fluid can be challenging to remove from produced water using typical separation and filtering techniques. For example, surfactants from stimulation or injection fluids encourage emulsification of the production fluid, making separation of oil and water phases more difficult. This difficulty presents challenges in disposal and re-use of produced water. For example, some CEOR chemicals, including some surfactants, are acutely toxic and are not easily biodegradable, and thus must be removed from produced water prior to discharging produced water into the ocean, or otherwise disposing of or re-using the produced water.

Figure 2:
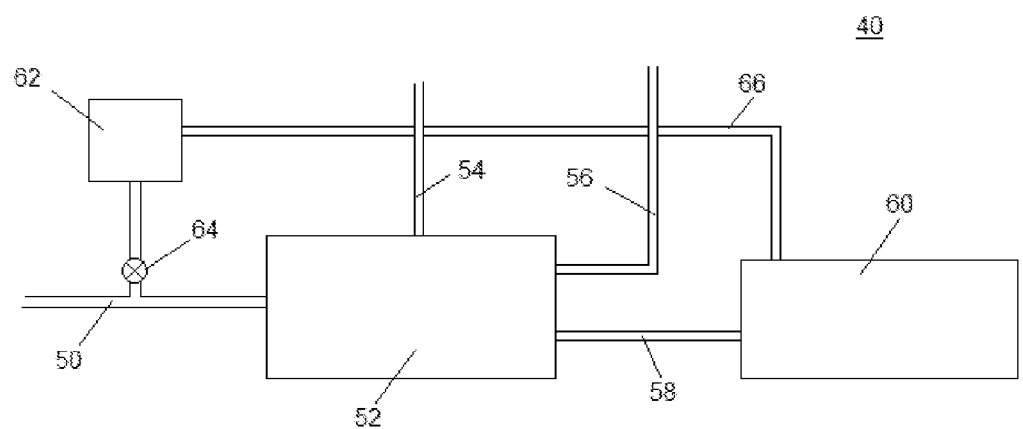
FIG. 2 depicts an embodiment of a system for processing production fluid produced from an earth formation.

FIG. 2 illustrates an embodiment of the processing facility 40, which includes features configured to facilitate removal of surfactants and other chemicals from production fluid and/or produced water. Although the surfactant removal features are described in conjunction with the system 10 and the processing facility 40, they are not so limited. Such features may be used in conjunction with any land-based or offshore application that employs chemical injection into a formation.

The processing facility 40 in this embodiment includes a device or system configured to inject or otherwise introduce a treatment fluid into production fluid and/or produced water. The treatment fluid is configured to reduce the water solubility of surfactants in production fluid produced from a formation, to allow for easier removal of such surfactants.

The treatment fluid includes one or more chemical compositions that are configured to facilitate removal of EOR chemicals. In one embodiment, the treatment fluid includes a chemical composition or compositions that form multivalent cations. These compositions may be used in conjunction with or without other chemicals commonly termed emulsion breakers. Such compositions may be combined with water and/or brine to form a solution having a selected concentration of multivalent cations, such as divalent or trivalent cations, with or without pH modification. A number of chemical components used in CEOR are anionic surfactants, and the multivalent cations function to precipitate the surfactants and/or greatly reduce their water solubility, which makes removal more feasible.

The treatment fluid may be introduced or injected into production fluid at any desired location or stage of production and processing. The fluid may be injected downhole, at the surface (e.g., via subsea unit 20), on a platform and/or during processing.

Referring again to FIG. 2, the processing facility 40 includes equipment for separating oil and gas from other fluids in the production. The facility performs various processing functions, such as dehydration, purification, oil and water separation, oil and gas separation, and other functions.

The processing facility 40 in this embodiment includes a production line 50 that receives production fluid and moves or directs the production fluid to a separator system 52, in which gas and oil are separated from the production fluid. The separator system 52 may include one or more separation devices, such as gravity separation vessels and/or hydrocyclones. An exemplary separator system 52 includes a three-phase separator in which separation of gas, oil and water phases is performed. Gas separated from the fluid is directed via a gas line 54 to facilities for compression, venting or further treatment. The separated oil is directed via an oil line 56 to deliver the oil to a storage and/or treatment vessel or platform, or to an onshore facility.

The liquid remaining after removal of gas and oil is referred to as produced water. Produced water is a fluid that consists of mostly water, but also includes various constituents, some of which may be hazardous or toxic. Produced water may include salt, oil and other hydrocarbons, chemical additives and other constituents. The produced water is directed via a produced water line 58 to a produced water treatment system 60. Exemplary components of the treatment system 60 include a flash vessel to remove dissolved gases, and separators (e.g., corrugated plate interceptors) to further remove oil so that the oil concentration is sufficiently low to allow for discharge or use as a stimulation fluid. Techniques for removing oil and grease and other organics from produced water include, e.g., physical separation and solvent extraction. Other exemplary components include devices for removing salt and/or other inorganics (e.g., nitrate, ammonia, arsenic, metals) from the produced water. Exemplary techniques include membrane processes, ion exchange, capacitive deionization and thermal distillation. Membrane processes include, e.g., filtration, membrane softening and reverse osmosis.

The processing facility 40 also includes a surfactant removal system or facility configured to add or inject treatment fluid to facilitate removal of surfactants. For example, a mixing and/or storage vessel 62 contains a treatment fluid having a concentration of multivalent cations. A pump and valve unit 64 is operable to introduce the treatment fluid into the production fluid line 50 upstream of the separator system 52. The treatment fluid decreases the water solubility of anionic surfactants in the production fluid, so that the surfactants are separated into the oil phase by the separator system 52. The treatment fluid may be injected or introduced into production fluid and/or produced water at any suitable location in the system 40 or at any suitable stage of production fluid processing. For example, treatment fluid may be injected into production fluid downhole or at the sea floor (e.g., via the subsea unit 20), or injected into produced water after initial separation of the gas, oil and water phases.

After separation, treatment and surfactant removal, the produced water may be discharged into the ocean, otherwise disposed of, or re-used. For example, a produced water line 66 is connected to the produced water treatment system 60 to divert all or some of the treated produced water to the mixing and storage vessel 62.

In one embodiment, multivalent cations for use in the treatment fluid are obtained from byproducts of production fluid processing. For example, a membrane softening device generates a reject stream that includes a high concentration of multivalent cations. All or a portion of this reject stream may be used to inject a concentration of multivalent cations into production fluid and/or produced water. The reject stream is directly injected into the production fluid and/or produced water, or is blended with a fluid to generate the treatment fluid used for surfactant removal.

Although water separation and treatment are described as being performed on a platform or other surface location, it is not so limited. For example, separation devices may be deployed subsea or on the sea floor to allow produced water to be treated and discharged.

Figure 3:
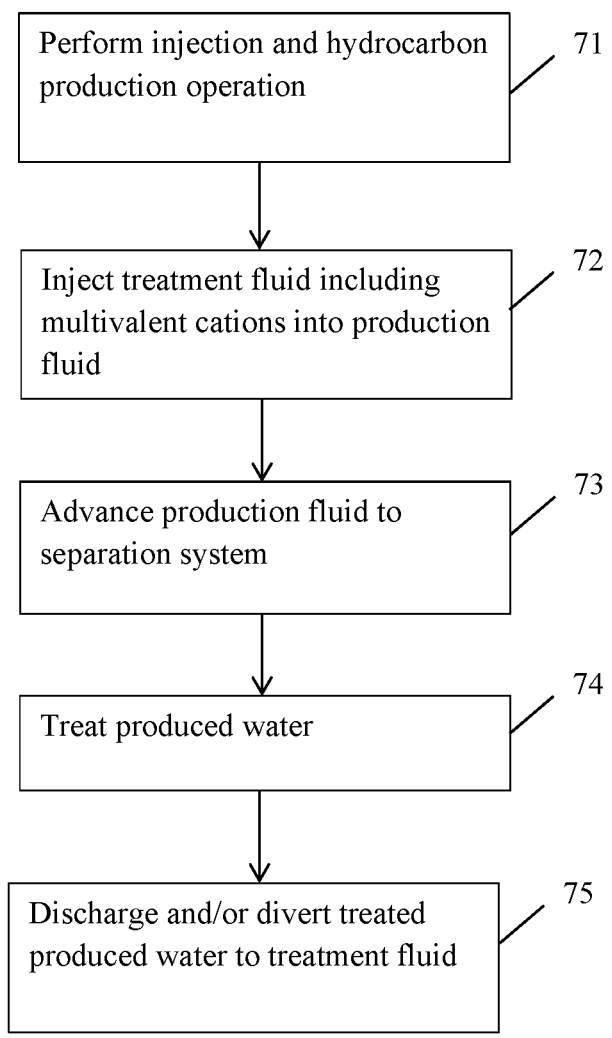
FIG. 3 is a flow chart depicting an embodiment of a method of performing production and/or production fluid processing processes.

FIG. 3 illustrates a method 70 for performing a production and/or production fluid processing operation. The method 70 includes one or more of stages 71-75 described herein, at least portions of which may be performed by a processor (e.g., the processing unit 36). In one embodiment, the method 70 includes the execution of all of stages 71-75 in the order described. However, certain stages 71-75 may be omitted, stages may be added, or the order of the stages changed.

In the first stage 71, an injection and production operation is performed, during which injection fluid is pumped or injected into a borehole in a formation. In one embodiment, the injection fluid includes water or brine and CEOR chemicals. The CEOR chemicals include surfactants, some of which may include anionic surfactants. Examples of such surfactants are anionic sulfonate olefins, linear alkane sulfonates, carboxylates or mixtures of such chemicals. Other stimulation fluids may be injected with the CEOR injection fluid or at a different stage. Other exemplary stimulation fluids include water, fracturing fluid, acid stimulation fluid, gases (e.g., carbon dioxide) and others.

Subsequent to injection, production fluid is produced from the borehole. The production fluid may include hydrocarbons (e.g., oil and/or gas), water or brine, and surfactants from the injection fluid. The injection fluid may be injected in the same borehole that produces production fluid or in a different borehole. For example, injection fluid is injected into a production borehole, and/or is injected into a borehole (an injection borehole) at a different location.

For example, a stimulation fluid including brine, surfactants and other suitable constituents (e.g., polymers) is injected into the injection borehole 16 of FIG. 1. Production fluid is produced from the production borehole 22 and flowed to the processing facility 40.

In the second stage 72, a treatment fluid that includes multivalent cations is combined or injected into the production fluid and/or into produced water. The multivalent cations combine with anions from the surfactants to produce a neutral precipitate that is less water soluble than the surfactant or is entirely water insoluble. This allows for the surfactants to be removed from produced water.

In one embodiment, the treatment fluid is injected upstream from the processing system and/or separators. For example, production fluid in the production line 50 of FIG. 2 is advanced to the separator system 52. Treatment fluid from the mixing and/or storage vessel 62 is combined with the production fluid upstream of the separator system 52.

As the production fluid is separated into gas, oil and water phases, the treated surfactant precipitate, which is now at least partially oil soluble, separates from the water phase and stays with the oil phase. The precipitate not only facilitates removal of surfactants from water, but also facilitates separation of the surfactants from oil when the oil is treated further.

In one embodiment, the treatment fluid includes a solution of water (fresh or brine) and divalent or trivalent cations. For example, the solution includes a high concentration of metal divalent and/or trivalent cations. Exemplary metal compounds that may be used to form the solution include calcium, magnesium, zinc, copper, iron and aluminum compounds. For example, a treatment fluid is generated by combining aluminum chloride with water or brine to form a 500 parts-per-million aluminum chloride solution. This concentration is exemplary, as the concentration may change due to factors such as the salinity and/or pH of the water. In one embodiment, a "high concentration" of metal ions refers to a molar concentration of the metal ions in a solution in excess of the molar concentration of the surfactants in the solution. A "high concentration" of metal ions may refer to a concentration of the metal that is an order of magnitude or more than the metal's concentration in the produced water. The solution may be formed by mixing a suitable cation forming compound with water or brine in a separate mixing container such as the vessel 62, or by injecting the compound directly into the production fluid, where a solution is formed with water present in the production fluid.

It is noted that injection of treatment fluid may be performed before, during or after performing separation or other processes. For example, stage 72 is performed prior to stage 73 in instances where injection fluid is introduced upstream of a separation system. In other examples, stage 72 is performed concurrently with stage 73 described below, by injecting treatment fluid into selected locations within a separation system. In still other examples, treatment fluid is injected or introduced into produced water after at least initial separation processes are performed.

In the third stage 73, the production fluid (including oil soluble precipitate) is advanced to a separation system such as the separator system 52. In the separation system, the production fluid is separated into gas, oil and/or water phases, producing either an oil phase that is all or mostly oil and a produced water phase. The produced water phase primarily includes water, but may also include relatively small amounts of oil and/or gas, as well as other compounds or substances.

Surfactants may be removed during this stage if the treatment fluid is injected prior to separation. Treated surfactants, which are now at least partially oil soluble, are separated via the separation system into the oil phase.

In the fourth stage 74, produced water is further treated, for example, via the produced water treatment system 60. Exemplary treatment processes include further separation of oil and/or gas from the produced water and removal of contaminants or other unwanted substances. In one embodiment, the produced water is softened to remove metals from the produced water using suitable methods such as ion-exchange or membrane methods (e.g., reverse osmosis).

In the fifth stage 75, the treated produced water is discharged into the ocean (or other body of water), otherwise disposed of, and/or diverted for re-use. In one embodiment, all or a portion of the treated produced water is diverted for use in the treatment fluid that is introduced for surfactant removal. For example, at least a portion of the produced water ejected from the treatment system 60 is diverted to the mixing and/or storage vessel 62, where it is mixed with a compound to form a solution including divalent or trivalent ions.

In one embodiment, the produced water or a byproduct of produced water treatment is used as the treatment fluid. For example, all or a portion of the reject stream from a water softening system is diverted and directed to a storage vessel or injected upstream directly into production fluid and/or produced water.

Embodiments described herein provide various advantages, including the ability to effectively remove at least some EOR chemicals from produced water. Removal of some of these chemicals can be challenging, and typical methods of separating and treating production fluids are not able to sufficiently remove CEOR chemicals, particularly surfactants. The embodiments described herein address such challenges. Other advantages may include cost savings and efficiencies resulting from re-use of existing streams resulting from production fluid processing.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A method of processing production fluid, comprising;
    receiving production fluid from a borehole in an earth formation, the production fluid including surfactants injected into the earth formation to stimulate production of hydrocarbons therefrom;
    processing the production fluid to separate the production fluid into at least an oil phase and a produced water, and softening produced water to remove metal cations therefrom;
    introducing a treatment fluid from a treatment fluid source into the produced water, the treatment fluid including a concentration of multivalent cations, the multivalent cations configured to reduce water solubility of the surfactants and directing at least a portion of a reject stream from the softening step into the produced water, the reject stream including the metal cations removed from the produced water; and
    removing the surfactants from the produced water.

2. The method of claim 1, wherein the treatment fluid includes an aqueous solution of a metal salt.

3. The method of claim 1, further comprising diverting at least a portion of the produced water to the treatment fluid source.

4. The method of claim 1, wherein the method is performed at an offshore location.

5. The method of claim 4, further comprising disposing the produced water into a body of water at or near the offshore location after removing the surfactants.

6. The method of claim 1, further comprising, prior to receiving the production fluid, performing a chemical enhanced oil recovery (CEOR) operation, the CEOR operation including injecting a stimulation fluid including the surfactants into the earth formation.

7. A system for processing production fluid, comprising;
    a production line coupled to a borehole in an earth formation;
    a processing facility configured to receive production fluid from the production line, the production fluid including surfactants injected into the earth formation to stimulate production of hydrocarbons therefrom, the processing facility including a separator configured to separate the production fluid into at least an oil phase and a produced water, the processing facility including a membrane water softening device configured to soften the produced water by removing metal cations therefrom, wherein the processing facility includes a produced water line configured to direct at least a portion of a reject stream from the softening device into the produced water, wherein the reject stream includes the metal cations removed from the produced water; and
    a surfactant removal facility configured to introduce a treatment fluid from a treatment fluid source into the produced water, the treatment fluid including a concentration of multivalent cations, the multivalent cations configured to reduce water solubility of the surfactants.

8. The system of claim 7, wherein the treatment fluid includes an aqueous solution of a metal salt.

9. The system of claim 7, wherein the processing facility is configured to divert at least a portion of the produced water to the treatment fluid source.

10. The system of claim 7, wherein the processing facility and the surfactant removal facility are disposed on an offshore platform or vessel.

11. The system of claim 10, wherein the processing facility is configured to discharge at least a portion of the produced water into a body of water at or near the offshore location after removal of the surfactants.

12. The system of claim 7, further comprising an injection facility configured to perform a chemical enhanced oil recovery (CEOR) operation, the CEOR operation including injection of a stimulation fluid including the surfactants into the earth formation.

\* \* \* \* \*